June 19, 1951           E. B. WAGNER           2,557,485

AUXILIARY GEAR DRIVE FOR VEHICLES

Filed Feb. 7, 1949           2 Sheets-Sheet 1

INVENTOR.
EDDIE B. WAGNER
BY
Buckhorn and Cheatham
Attorneys

June 19, 1951  E. B. WAGNER  2,557,485
AUXILIARY GEAR DRIVE FOR VEHICLES
Filed Feb. 7, 1949  2 Sheets-Sheet 2

INVENTOR.
EDDIE B. WAGNER
BY
Buckhorn and Cheatham
Attorneys

Patented June 19, 1951

2,557,485

UNITED STATES PATENT OFFICE 2,557,485

AUXILIARY GEAR DRIVE FOR VEHICLES

Eddie B. Wagner, Portland, Oreg.

Application February 7, 1949, Serial No. 74,964

4 Claims. (Cl. 180—75)

The present invention comprises an auxiliary gear drive for association within the hubs of the driving wheels of an automotive vehicle for the primary purpose of reducing torque on the driving axle and parts between the wheel and the engine. The invention is designed particularly for use in material handling vehicles which are subjected to heavy strain such as trucks, tractors, scoops, cranes and hoists, especially of the type driven by an internal combustion engine through the medium of a differential. The problem which the present invention solves is in relieving stresses on the driving mechanism. For example, in one vehicle to which the invention is applied the engine is of extra strength in order that heavier than usual loads may be picked up by means of a scoop, and the transmission includes sets of gears of such low speed ratio that it is possible, when the scoop encounters unusual resistance, for the differential to be torn to pieces or the axle twisted or broken. The present invention is designed to eliminate any such occurrence since the greater proportion, in the specific example two-thirds, of the torque is taken from the axle. Instead of driving a 36" diameter tire the axle drives a 5" diameter main gear which transmits power to a 15" diameter internal gear through a set of spur gears mounted on a gear carrier. Gear reduction from axle to wheel is 3 to 1 with the resulting advantage of lesser operating and maintenance cost even under unusual conditions or rough handling by inexperienced operators.

It is recognized that gear drives of this character are generally old, but the combination expressed in the present application is believed to be new and has the greater advantages of extreme simplicity both in manufacturing and in assembly of the parts, and in sturdiness.

A further object of the present invention is to provide means whereby the gear carrier may be made to remain stationary in order that the axle may drive the wheel or, in one simple, easily and quickly performed operation, the gear carrier may be released so that the spur gears planetate about the stationary main gear, with the wheel thus being in a free-wheeling condition. The object of this improvement is to provide means whereby a vehicle of the character described may be rapidly transported from place to place by towing it behind a towing vehicle. It is common practice for contractors and others involved in material handling operations to employ automotive vehicles of various sorts such as scoops, hoists, and the like, in widely separated localities. Due to the low gear ratios usually employed in such vehicles, it would require relatively long periods of time to drive such a vehicle from one locality to another; therefore, the present invention is designed to save time, labor and expense by making it possible for the vehicle to be towed at high speeds.

The objects and advantages of the present invention will be more readily ascertained by inspection of the following specification taken in connection with the accompanying drawings wherein like numerals refer to like parts throughout, while the features of novelty will be more distinctly pointed out in the appended claims.

In the drawings

Figure 1:
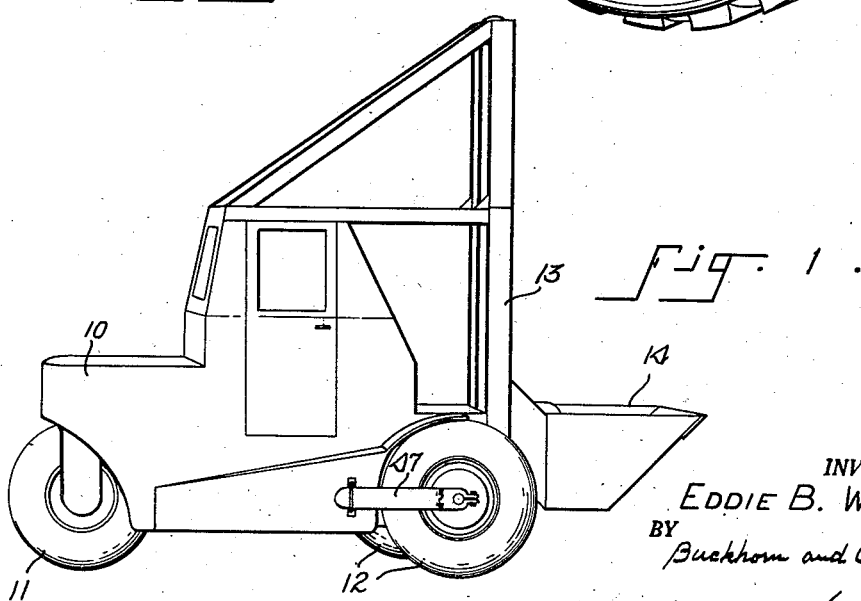
Fig. 1 is a side elevation, slightly in perspective, of an industrial vehicle having the present invention incorporated therein.

Referring to Fig. 1, there is shown an automotive vehicle 10 of the tricycle type comprising a tiller wheel 11, and a pair of driving wheels 12 at opposite ends of a driving axle driven through a differential (not shown). The vehicle is illustrated as comprising an upright tower 13 along which a scoop 14 may be elevated under control of the driver. The vehicle of course could be designed for other purposes.

Figure 2:
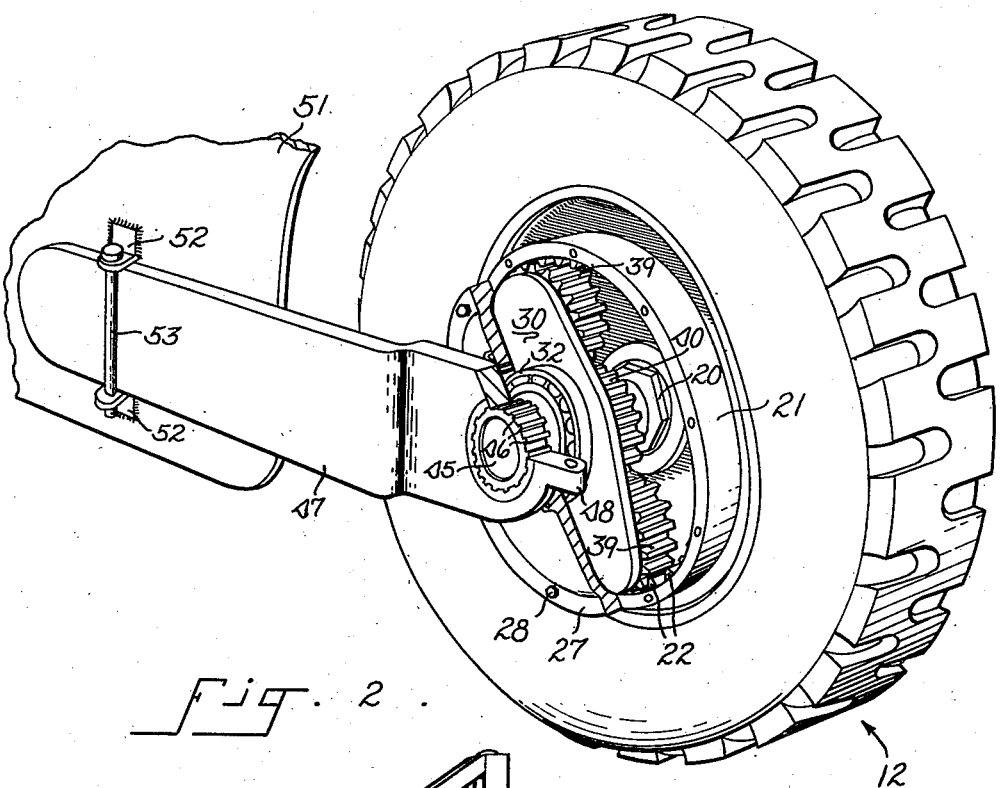
Fig. 2 is a view in perspective of one of the driving wheels of the vehicle, with parts broken away.
Figure 3:
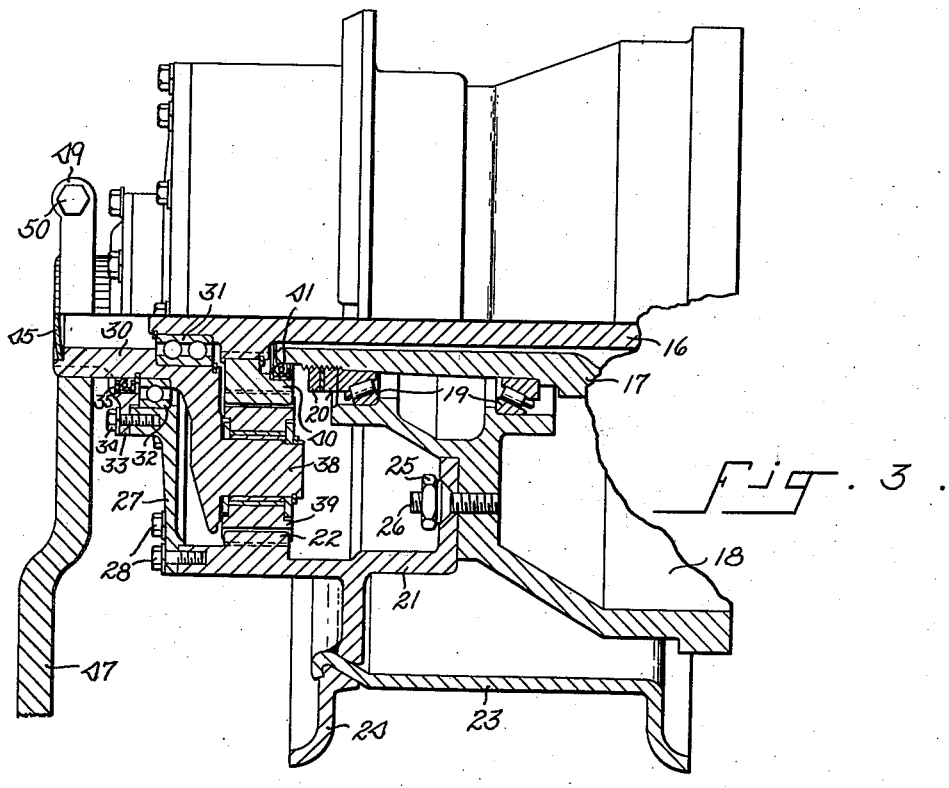
Fig. 3 is a partial view of a wheel hub having the present invention incorporated therein, the view being partly in section.

In Figs. 2 and 3 the details of one of the wheels 12 are set forth. The invention is designed for application to a vehicle including an axle 16 projecting through and beyond the end of an axle housing 17. A brake drum 18 is rotatably mounted upon the end of the axle housing by means such as the spaced pair of roller bearing assemblies 19 which are retained by nuts 20 threaded onto the end of the housing. The brake drum provides means for detachably supporting a ring gear hub 21 having internal ring gear teeth 22 thereon concentrically surrounding a portion of the axle projecting beyond the end of the axle housing. The ring gear hub also supports a tire rim such as the portion 23 welded to a projecting flange thereon and the separable retainer ring 24. The ring gear hub is preferably retained on a flange of the brake drum by nuts 25 screwed onto the ends of studs 26 projecting from the brake drum flange whereby the rim 23 and the hub 21 may be removed if desired. The hub radially surrounds the projecting end of the axle, and a housing for enclosing the axle is completed by an annular end plate 27 retained in position by bolts 28 threaded into the end of the hub. A gear carrier 30 is retained concentrically with the axle by opposed bearings comprising an inner ball-bearing assembly 31 supporting the free end of the axle 16 within the gear carrier and an outer ball-bearing assembly 32 concentrically supporting the gear carrier in the end plate 27. The ball-bearing assembly 32 is preferably retained in position by an annular cap plate 33 retained on the end plate by bolts 34 and providing a support for an oil seal 35 for preventing grease from escaping from within the assembly or dust from entering the assembly.

The gear carrier 30 preferably comprises a pair of radially spaced arms from which project inwardly directed stub shafts 38 upon each of which is rotatably mounted a spur gear 39 in position to mesh with the ring gear teeth. The spur gears in turn mesh with a main gear 40 fixed to the portion of the axle between the end of the axle housing and the bearing assembly 31, the main gear being preferably splined to the axle. An oil seal 41 may be provided in position to prevent the escape of lubricating medium from between the axle and its housing. Suitable snap retainer rings are shown throughout whereby assembly and disassembly of the various parts may be easily effected, but the exact mechanical details are not important to the invention. Similarly, the ring gear teeth 22 are preferably milled into an internal flange in the hub 21, but the invention contemplates the substitution therefor of a separately formed ring gear which is attached to a separately formed hub.

The central portion of the gear carrier 30 projects through the opening of the end plate and attached cap plate and could comprise a cup-shaped extension. However, for ease in manufacture, the portion is an open cylinder having its outer end sealed by a snap plate 45. The outer surface of the projecting portion is preferably provided with non-cylindrical surfaces, such as the splines 46 illustrated, whereby an arm 47 may be firmly clamped onto the gear carrier. The arm 47 preferably comprises an internally splined split ring portion at one end having means associated therewith for clamping the ring firmly against the gear carrier, in the preferred form such means comprising a threaded lug 48 on one arm, and an opposed non-threaded lug 49 on the other arm of the split ring, for retaining a clamping bolt 50. The arm may be applied by sliding the splined portions together and slightly turning the bolt 50. The free end of the arm projects forwardly into engagement with a non-rotating or relatively stationary part of the vehicle. In the present disclosure the vehicle frame includes heavy, rigid side plates 51 and the arm attaching means comprises a pair of vertically spaced, apertured ears 52 welded to the outer surface of the side plate. A pin 53 is retained in the ears 52 at such a distance from the surface of plate 51 as to permit the arm 47 to be slid longitudinally therebetween, or the pin 53 may be withdrawn so as to permit the arm 47 to be moved laterally into position. When the arm is in position as shown in Figs. 1 and 2, the gear carrier is prevented from rotation so that torque applied to the axle rotates the ring gear to drive the vehicle. When the arm is removed the gear carrier is free to rotate so that the wheels may turn without turning the axle, thereby permitting the vehicle to be towed.

Figure 4:
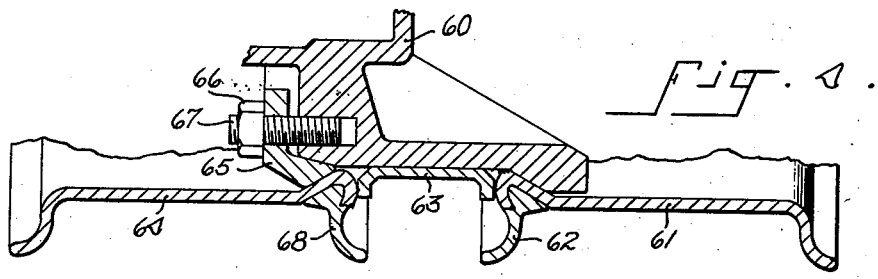
Fig. 4 is a sectional view of a portion of a dual tire wheel assembly which may have the present invention incorporated therewith.

A modification is disclosed in Fig. 4 wherein a modified form of ring gear hub 60 is disclosed as having an inner rim 61 welded thereto which is adapted to be completed by a separable ring 62. The hub is so formed as to support a spacer ring 63 against which an outer rim 64 may be clamped by a clamping ring 65 held in position by nuts 66 on studs 67, the outer rim being completed by a removable ring 68. Thus the present invention may be incorporated in vehicles having dual driving wheels merely by the substitution of one form of ring gear hub for the other.

Having illustrated and described preferred embodiments of the invention, it should be apparent to those skilled in the art that the invention permits of modification in arrangement and detail. I claim as my invention all such modifications as come within the true spirit and scope of the appended claims.

I claim:

1. An auxiliary gear drive for an automotive vehicle having an axle housing and an axle including an end portion projecting axially beyond the axle housing, comprising a wheel hub assembly including a cylindrical portion surrounding the end of the axle, means rotatably mounting said wheel hub assembly on the axle housing, an internal ring gear fixed to said wheel hub assembly in coaxial relation to said end portion of the axle, an annular end plate attached to the outer end of said cylindrical portion of the wheel hub assembly, a gear carrier mounted in said wheel hub assembly including a cylindrical, central portion projecting outwardly through said end plate in coaxial relation to the axle, first bearing means rotatably supporting said cylindrical portion of the gear carrier in said end plate, second bearing means rotatably supporting the end of said axle in said gear carrier, a plurality of spur gears rotatably mounted on said gear carrier and meshing with said ring gear, a main gear coaxially fixed to said projecting axle portion and meshing with said spur gears, an arm removably attached to the projecting portion of said gear carrier in non-rotative relation thereto, and means detachably securing said arm to a relatively stationary portion of the vehicle.

2. An auxiliary gear drive for an automotive vehicle having an axle and a relatively fixed axle housing surrounding the axle up to a point near the end of the axle, comprising a wheel hub assembly rotatably supported on said housing and enclosing the projecting end of said axle, said wheel hub assembly having a central opening in the outer end thereof coaxial with said axle, a gear carrier within said wheel hub assembly and rotatably supported in said opening, means rotatably supporting the end of said axle in said gear carrier, internal ring gear teeth fixed to said wheel hub assembly in coaxially spaced relation to said axle, a main gear coaxially fixed to the portion of said axle projecting from said housing, a plurality of spur gears rotatably mounted on said gear carrier and meshing with said ring gear teeth and said main gear, said gear carrier having a portion projecting outside of said assembly through said opening, an arm removably attached to the projecting portion of said gear carrier, cooperative means on said arm and the projecting portion of said gear carrier to prevent relative rotation thereof, and means on said vehicle for detachably securing the free end of said arm to prevent rotation of said gear carrier.

3. An auxiliary gear drive for an automotive vehicle having an axle and a relatively fixed axle housing surrounding the axle up to a point near the end thereof, a portion of said axle projecting axially beyond said axle housing, comprising a wheel hub assembly rotatably supported on said axle housing and including a cylindrical portion coaxially surrounding the protruding end of the axle and an end portion attached to said cylindrical portion and forming therewith an enclosure for the end of the axle, said wheel hub assembly having an opening in said end portion coaxial with said axle, a gear carrier rotatably supported within said wheel hub assembly coaxially with said axle and including a portion projecting outwardly through said opening, means rotatably supporting the end of said axle in said gear carrier, an internal ring gear inside of and fixed to said wheel hub assembly and coaxially surrounding the portion of the axle projecting beyond said axle housing, a main gear coaxially fixed to and surrounding the projecting portion of the axle, a pair of spur gears rotatably mounted on said gear carrier and meshing with said ring gear and said main gear, and an arm removably attached to the portion of said gear carrier projecting outwardly from said wheel hub assembly and to a relatively stationary part of the vehicle for preventing rotation of said gear carrier whereby said wheel hub assembly may be driven from the axle when said arm is in position, said arm and said projecting portion of the gear carrier having meshing splines to prevent relative rotation of said arm and gear carrier, and when said arm is removed said gear carrier is free to rotate and permit free rotation of said wheel hub assembly by planetation of said spur gears about said main gear.

4. An auxiliary gear drive for an automotive vehicle having an axle and a relatively fixed axle housing surrounding the axle up to a point near the end of the axle, said axle having a portion projecting axially beyond the end of said axle housing, comprising a wheel hub assembly rotatably supported on said axle housing and enclosing the projecting end of the axle, said wheel hub assembly having a central opening in the outer end thereof coaxial with said axle, a gear carrier enclosed within said wheel hub assembly and rotatably supported in said opening, means rotatably supporting the end of said axle in said gear carrier, an internal ring gear fixed to said hub assembly and coaxially surrounding the projecting portion of said axle substantially radially outward therefrom, a main gear coaxially fixed to the projecting portion of said axle, said gear carrier including a plurality of pivot means whose axes are parallel to the axis of the axle and each of which is located midway between the teeth of said main gear and said ring gear, a spur gear rotatably mounted on each of said pivot means and meshing with said main gear and said ring gear, said gear carrier having a portion concentrically projecting through said opening beyond the outer surface of said wheel hub assembly, an arm including an end removably embracing said projecting portion of the gear carrier, means for fixing said end of said arm to said projecting portion of the gear carrier, cooperative means on said portion and said arm end for holding said arm in non-rotative relation to said portion, and means on the vehicle to hold the other end of said arm and thereby prevent rotation of said gear carrier.

EDDIE B. WAGNER.

REFERENCES CITED

The following references are of record in the file of this patent:

UNITED STATES PATENTS

| Number | Name | Date |
|---|---|---|
| 1,384,164 | Sprague | July 12, 1921 |
| 1,467,939 | Knap | Sept. 11, 1923 |